UNITED STATES PATENT OFFICE 2,651,583

NONGLARE COATING COMPOSITION

Edward N. Horn, New York, N. Y., and John Samko, Jr., Newark, N. J., assignors to Sun Chemical Corporation, Long Island City, N. Y., a corporation of Delaware No Drawing. Application September 19, 1951, Serial No. 247,358

4 Claims. (Cl. 106—208)

The present invention relates to film-forming compositions, and particularly to compositions adapted for forming thin, transparent, non-glare films, when applied upon transparent materials such as glass and the like.

The hazards of sun glare and reflected sunlight in motoring are well-known to all motorists. Prolonged sun glare may be a cause of serious eyestrain to the motorists, and the momentary blinding of the motorist at a critical moment by a burst of reflected sunlight may well be the indirect cause of a serious accident. That sun glare is a recognized hazard toward safe driving is evidenced by the various devices employed to eliminate or to minimize the same. For example, sun glasses worn by the motorist are an effective aid in eliminating the effects of sun glare or of reflected sunlight upon the motorist. However, many persons find it annoying to wear glasses, and others find that sun glasses limit their field of vision too greatly and, therefore, usually prefer to do without the aid of sun glasses when driving. The most efficient and effective means in common use for substantially eliminating the effects of sun glare and reflected sunlight upon the motorist is the use of window glass in motor vehicles which acts as a screen or filter against the glare of sunlight. Such glass usually contains a coloring agent, the color of which is within that range of the spectrum which most effectively screens sunlight without impairing the transparency of the glass and hence the vision of the motorist. While such glass is available on the market, it is rather expensive, and the cost of replacing the windows of those motor vehicles having windows of colorless glass with non-glare glass constitutes an expense which the average motorist may well find prohibitive. Further, many motorists appear to be prejudiced against the idea of having permanently colored glass windows in their motor vehicles.

The present invention concerns itself with the provision of a means for effectively screening sunlight through transparent materials such as glass so as to substantially eliminate sun glare without impairing the transparency or vision qualities of the said materials. The present invention further concerns itself with a means of the character described which consists of a thin, transparent, non-glare coating or film applied upon a transparent surface, which coating or film lends itself to easy and rapid removal when not desired. The present invention also concerns itself with the provision of film-forming compositions especially adapted for forming thin, transparent, non-glare films or coatings when applied to transparent surfaces. The film-forming compositions of the present invention are inexpensive, lend themselves to easy and rapid application, and when freshly applied as thin films upon transparent surfaces are completely effective in screening sunlight so as to substantially eliminate the effects of sun glare.

The film-forming compositions of the present invention consist of aqueous solutions of a hydrophilic colloid, and contain coloring matter which may be a water-soluble dye, or mixtures of such dyes, or which may be a transparent pigment in colloidal suspension in the said compositions, and a water-miscible wetting agent.

The term "hydrophilic colloid" as employed in the present invention refers to those water-soluble gums or resins which are capable of forming thin, transparent, homogeneous and continuous films when applied from aqueous solutions thereof upon a suitable surface. As examples of hydrophilic colloids capable of use in the compositions of the present invention there may be listed the water-soluble vegetable gums such as gum arabic, gum karaya, gum tragacanth, and locust bean gum, the water-soluble ethers of cellulose such as methyl cellulose and water-soluble ethyl cellulose, sodium alginate, polyvinyl alcohol and sodium polyacrylate. The amount of hydrophilic colloid which should be employed in the compositions of the present invention is governed by the film-forming properties of the particular hydrophilic colloid employed, as well as by the solution viscosity of the said colloid. An amount of the said hydrophilic colloid sufficient to insure the formation of a continuous film when deposited from a water solution thereof should be employed in preparing the compositions of the present invention. However the amount of hydrophilic colloid utilized should also be such as to provide a free flowing liquid composition; firstly, because it is contemplated to employ spraying methods for application of the coating compositions and, secondly, because several of the hydrophilic colloids, when employed in excessive amounts, form gel-like compositions which do not lend themselves to the formation of continuous, homogeneous and smooth films. The ratio therefore in which the hydrophilic colloids should be employed to obtain the desirable results obtained according to the present invention should be within the range of approximately 5 to 20% by weight based upon the weight of the finished composition.

The sunlight screening effect of the films obtained by the use of the compositions of the present invention is secured by means of the coloring material employed and, in this connection, it is preferable and advisable to employ coloring materials having colors in that range of the spectrum which most effectively filters actinic light. Any of the common water-soluble dyes may be used as the coloring material, although those dyes in the green and blue shades are preferred. It is also advisable to select a dye which has some degree of permanency towards sunlight. However, since the films formed from the compositions of the present invention are so easily removed and can so easily be replaced, this is not too important a factor. Among those dyes which may be employed may be mentioned Brilliant Green, Malachite Green, Acid Green, Fast Green, Victoria Blue, Heliogen Blue, Patent Blue V, Rhodamine B, and the Auramine and Thioflavin Yellows such as Auramine G and Thioflavin S. The amounts in which the coloring material should be utilized will depend upon the efficiency of the coloring material in screening sunlight. Further, the coloring material should not be present in such amounts as to impair the vision qualities or the transparency of the material upon which the non-glare film is to be formed. It has been found that an amount of the dye within the range of approximately 0.25 to 5.0% by weight based on the weight of the finished composition will give most satisfactory results.

It is also possible to utilize pigments as the coloring material of the compositions of the present invention, and when so used, the pigments should be in the form of aqueous colloidal suspensions thereof. Such colloidal suspensions may be prepared, for example, by treating pigment press cake with a suitable dispersing or peptizing agent and subjecting the pigment to high speed agitation or by milling the same in a suitable device, such as a ball mill, till a satisfactory suspension of the pigment in the water contained in the press cake has been obtained. It is essential that the pigments utilized be of the transparent type. Opaque pigments and pigments containing opaque extenders should not be utilized in the practice of the present invention since the transparency of the finished film would be seriously impaired thereby. A suitable pigment suspension for use in the present invention may be prepared utilizing phthalocyanine press cake and approximately 0.5% based on the weight of the press cake of a dispersing agent such as those sold under the trade names Darvan and Daxad, and which are polymerized organic salts of alkyl aryl sulfonic acids. When utilizing pigments as the coloring material of the compositions of the present invention, the pigment should most satisfactorily be present in an amount constituting from approximately 2 to approximately 5% by weight based on the weight of the finished composition.

The compositions of the present invention also contain a water-miscible wetting agent. This material imparts improved leveling properties to the film-forming compositions and insures the formation of a smooth, continuous and homogeneous film even when spray application is employed to apply the coating. Within the limitation imposed by possible non-compatibility of certain wetting agents with certain types of dyestuffs, generally any water-miscible wetting agents may be employed. As suitable wetting agents for carrying out the present invention, there may be mentioned the alkyl and aryl diesters of sodium sulfosuccinic acid such as the dioctyl ester of sodium sulfosuccinic acid, the dihexyl ester of sodium sulfosuccinic acid and the diamyl ester of sodium sulfosuccinic acid, sodium diisobutylphenoxyethyl sulfate, mannitan monolaurate, hexaethylene glycol monooleate and nonaethylene glycol mono- or di-ricinoleate. These materials are most effectively employed in amounts within the range of approximately 0.05 to 2.0% by weight based upon the weight of the finished composition.

The following examples are illustrative of the film-forming compositions of the present invention. The compositions may be prepared by simply dissolving the various components in the aqueous vehicle. This may be done in the cold or, if necessary, by gentle heating, and under agitation conditions.

*Example 1*

| | Parts by weight |
|---|---|
| Brilliant Green dye | 0.25 |
| Gum arabic | 5.00 |
| Water | 94.50 |
| Dioctyl ester of sodium sulfosuccinic acid | 0.25 |
| | 100.00 |

*Example 2*

| | Parts by weight |
|---|---|
| Malachite Green dye | 0.50 |
| Gum karaya | 5.00 |
| Water | 94.00 |
| Dioctyl ester of sodium sulfosuccinic acid | 0.50 |
| | 100.00 |

*Example 3*

| | Parts by weight |
|---|---|
| Acid Green dye | 1.00 |
| Methyl cellulose | 10.00 |
| Water | 88.25 |
| Mannitan monolaurate | 0.75 |
| | 100.00 |

*Example 4*

| | Parts by weight |
|---|---|
| Victoria Blue dye | 1.00 |
| Polyvinyl alcohol | 10.00 |
| Water | 88.50 |
| Dihexyl ester of sodium sulfosuccinic acid | 0.50 |
| | 100.00 |

*Example 5*

| | Parts by weight |
|---|---|
| Patent Blue V dye | 2.00 |
| Sodium polyacrylate | 10.00 |
| Water | 87.50 |
| Hexaethylene glycol mono-oleate | 0.50 |
| | 100.00 |

Application of the film-forming compositions of the present invention is comparatively simple. Since these compositions are free-flowing liquid materials, any suitable spraying method may be employed to apply the same upon the surface to be coated. Due to the excellent leveling properties of these compositions, the applied coating flows into smooth, thin, continuous films which on drying are completely transparent. It is understood that the preferred surface upon which it is contemplated to form then non-glare films in accordance with the present invention is one which is substantially smooth. However, this is not an essential requirement since the films formed from the compositions of the present invention will conform to the contour of the surface to be coated.

The films obtained from the compositions of the present invention are water-soluble and may readily be removed by washing with water. Since the films are water-soluble, it is naturally contemplated to form the said films upon the interior surfaces of windows and the like. The duration of effectiveness of the non-glare properties of the said films will, of course, vary, depending upon the resistance towards fading of the particular dye used. However, this is not a serious problem since the films can be renewed whenever desired. The compositions of the present invention further contain no materials which adversely affect painted or lacquered surfaces. Therefore, in spray application, masking of such surfaces is not required. Spatter resulting from the spray application of the compositions of the present invention may be removed from such surfaces by simply wiping with a damp cloth.

While the above products constitute preferred embodiments of the present invention, changes may be made therein without departing from the scope of the present invention as defined in the appended claims.

We claim:

1. A composition capable of forming thin, transparent films having non-glare properties when applied to transparent surfaces consisting of approximately 5 to 20% by weight of gum arabic, approximately 0.25 to 5.0% by weight of a substantially transparent water-soluble organic dyestuff, approximately 0.05 to 2.0% by weight of a water-soluble wetting agent, and water.

2. A composition capable of forming thin, transparent films having non-glare properties when applied to transparent surfaces consisting of approximately 5 to 20% by weight of gum karaya, approximately 0.25 to 5.0% by weight of a substantially transparent water-soluble organic dyestuff, approximately 0.05 to 2.0% by weight of a water-soluble wetting agent, and water.

3. A composition capable of forming thin, transparent films having non-glare properties when applied to transparent surfaces consisting of approximately 5-20% by weight of a water-soluble vegetable gum, approximately 0.25 to 5.0% by weight of a substantially transparent water-soluble organic dyestuff, approximately 0.05-2.0% by weight of a water-soluble wetting agent, and water.

4. A composition capable of forming thin, transparent films having non-glare properties when applied to transparent surfaces consisting of approximately 5% by weight of gum arabic, approximately 0.25% by weight of Brilliant Green dye, approximately 0.25% by weight of the dioctyl ester of sodium sulfosuccinic acid, and approximately 94.5% by weight of water.

EDWARD N. HORN.
JOHN SAMKO, Jr.

References Cited in the file of this patent

UNITED STATES PATENTS

| Number | Name | Date |
| --- | --- | --- |
| 2,174,629 | Greiner | Oct. 3, 1939 |
| 2,203,767 | Baldseifen | June 11, 1940 |
| 2,235,798 | Collings et al. | Mar. 14, 1941 |
| 2,321,270 | Bacon et al. | June 8, 1943 |
| 2,340,311 | Donovan | Feb. 1, 1944 |
| 2,395,654 | Brannigan | Feb. 26, 1946 |
| 2,447,462 | Harsh et al. | Aug. 17, 1948 |